United States Patent [19]

Nico, Jr. et al.

[11] Patent Number: 4,863,663
[45] Date of Patent: Sep. 5, 1989

[54] METHOD OF MAKING A MODEL, PROTOTYPE PART, AND MOLD

[75] Inventors: Pete Nico, Jr., Davisburg; Nicholas A. Vitale, Utica, both of Mich.

[73] Assignee: General Motors Corporation, Detroit, Mich.

[21] Appl. No.: 241,794

[22] Filed: Sep. 6, 1988

Related U.S. Application Data

[63] Continuation of Ser. No. 13,284, Feb. 11, 1984, abandoned.

[51] Int. Cl.$^4$ .................. B29C 33/44; B29C 33/56; B29C 41/22
[52] U.S. Cl. ........................ 264/130; 264/152; 264/220; 264/226; 264/255; 264/257; 264/258; 156/62; 156/64; 156/264; 434/82
[58] Field of Search ............... 264/162, 219, 220, 163, 264/317, 139, DIG. 66, DIG. 39, 225, 226, 227, 338, 129, 130, 134, 135, 257, 258, 255, 152; 29/407, 423; 434/82; 156/64, 153, 154, 245, 264; 114/65 R

[56] References Cited

U.S. PATENT DOCUMENTS

| | | | |
|---|---|---|---|
| 2,652,595 | 9/1953 | Kish | 264/227 |
| 2,859,795 | 11/1958 | Greig . | |
| 2,887,726 | 5/1959 | Vertin | 264/220 |
| 3,072,971 | 1/1963 | Kish . | |
| 3,076,231 | 2/1963 | Vertin | 264/220 |
| 3,113,788 | 12/1963 | Johnston . | |
| 3,161,555 | 12/1964 | Kish | 156/245 |
| 3,271,224 | 9/1966 | Bjernekull | 156/245 |
| 3,428,725 | 2/1969 | Delmonte | 264/227 |
| 3,492,392 | 12/1970 | Kasamatsu et al. . | |
| 3,507,730 | 4/1970 | Gambill et al. . | |
| 3,556,886 | 1/1971 | Reusser | 156/264 |
| 3,590,136 | 6/1971 | Kunishi et al. . | |
| 3,686,051 | 8/1972 | Samuel | 156/245 |
| 3,687,768 | 8/1972 | Vaitses | 156/245 |
| 3,773,581 | 11/1973 | Stanley | 264/219 |
| 3,775,214 | 11/1973 | Winters | 264/250 |
| 3,806,304 | 4/1974 | Tighe . | |
| 3,860,470 | 1/1975 | Jaisle | 264/258 |
| 3,989,789 | 11/1976 | Brookhart . | |
| 4,049,309 | 9/1977 | Seal | 264/219 |
| 4,055,613 | 10/1977 | Kapral | 264/219 |
| 4,073,049 | 2/1978 | Lint | 264/219 |
| 4,126,719 | 11/1978 | Koyanagi et al. . | |
| 4,150,084 | 4/1979 | Arenas . | |
| 4,179,093 | 12/1979 | Western | 425/405.1 |
| 4,201,823 | 5/1980 | Russell . | |
| 4,292,101 | 9/1981 | Reichert | 264/219 |
| 4,397,701 | 8/1983 | Johnson | 264/258 |
| 4,455,338 | 6/1984 | Henne . | |
| 4,474,722 | 10/1984 | Martin | 264/219 |
| 4,555,836 | 12/1985 | Martin | 29/428 |
| 4,581,192 | 4/1986 | Malen | 264/219 |
| 4,601,867 | 7/1986 | Martell et al. | 264/227 |

FOREIGN PATENT DOCUMENTS

| | | | |
|---|---|---|---|
| 1504833 | 2/1963 | Fed. Rep. of Germany | 264/219 |
| 1219665 | 6/1966 | Fed. Rep. of Germany | 264/219 |

*Primary Examiner*—James Lowe
*Assistant Examiner*—Jeremiah F. Durkin, II
*Attorney, Agent, or Firm*—Charles E. Leahy

[57] ABSTRACT

The design process for a motor vehicle component part by making drawings of cross sections of the part at spaced intervals along the surface. Cardboard templates are cut to the cross sectional shape of the inside of the part, and mounted on a rigid base at the same spaced intervals as the spaced intervals of the cross sections of the drawings to define a skeletal frame. A sheet material such as cardboard is adhesively bonded to the skeletal frame, to define a rough model of the part. This rough model is then layered with glass fiber and bonding resin and finished to the desired outside finished surface dimension shown on the drawing. This provides a finished model of the part, or the glass fibers and bonding resin build up may be removed from the cardboard to be a prototype part. Furthermore, the model may be used to make a mold from which a number of prototype parts may be made.

5 Claims, 3 Drawing Sheets

METHOD OF MAKING A MODEL, PROTOTYPE PART, AND MOLD

This is a continuation of copending U.S. Pat. Application Ser. No. 013,284 filed on Feb. 11, 1987, now abandoned.

The invention relates to a method in which a rough formed cardboard model is coated with glass fiber cloth to construct either a prototype part directly therefrom or a styling and die model which may then be employed to make a mold for the subsequent making of the prototype parts.

BACKGROUND OF THE INVENTION

The design, development, and prototyping of motor vehicle component parts, particularly injection molded or vacuum formed plastic parts and stamped metal parts, is a complicated and time consuming process. Traditionally a complete drawing is made of a component part and the drawing is then used to make a model of the part in wood or ren plank. From this wooden model, a prototype mold or die is made of kirksite, resin, or some other suitable material. Then, the prototype part is made from this prototype mold. As an adjunct to the above described method of designing and prototyping a part, it has been known to construct a cardboard model of the component part for purposes of aiding the designer in the three dimensional visualization of the component part.

Each time there is a design change in the component part, the process of making the drawing, making the wooden model, and making the mold must be repeated.

Accordingly, these design changes, which are a necessary and integral part of the design and development process, add weeks and months into the time necessary to design and develop a new motor vehicle.

It would be desirable to have a better method for designing and prototyping motor vehicle component parts in order to substantially reduce the amount of time needed to bring new products to the marketplace.

SUMMARY OF THE INVENTION

According to the present invention, the design process for a motor vehicle component part begins with the making of a drawing of the part. The drawing need not be complete in all respects, but must include at least cross sections of the part at spaced intervals along the surface thereof. A plurality of cardboard templates are cut to the cross sectional shape of the inside of the part, with the templates being cut somewhat smaller than the desired inside surface dimension of the part. These templates are mounted on a rigid base at the same spaced intervals as the spaced intervals of the cross sections of the drawings so that the templates define a skeletal frame of the part. The skeletal frame is then covered with a sheet material such as cardboard, which is adhesively bonded to the skeletal frame, to thereby define a rough model form and shape of the part. This rough model is then layered with glass fiber cloth and bonding resin and finished to the desired outside finished surface dimension shown on the drawing. The outside surface of the model can be verified by using a plurality of outside templates cut to the shape of the outside of the part at spaced intervals therealong.

The model is used to make a mold from which prototype parts may be made. This is done by coating the model with a release agent and then applying the mold material, such as successive layers of resin and glass fiber cloth. After hardening, the mold is pulled from the model and the mold cavity is used to form the required number of prototype parts.

In addition, prototype parts may be constructed directly from the rough model. In this case, the rough model form and shape of the inside of the part, previously provided by adhesively bonding the cardboard onto the skeletal frame, is coated with a release agent. Then, layers of glass fiber cloth and bonding resin are applied to a built up thickness which obtains the desired outside surface dimension of the part as shown in the drawing. This outside finished surface dimension is preferably obtained by employing a plurality of outside templates which are cut in the shape of the outside cross sectional shape of the part. After hardening, the prototype part is removed from the coated rough model.

Prototype parts made by this method can be used as a design aid for visualizing the part, evaluating die parting lines for aesthetics, etc. Seating bucks can be built from the prototype parts and evaluated for styling, function, aesthetics, etc.

Accordingly the feature, object and advantage of the present invention resides in the use of cross section data from a drawing to construct a rough cardboard model of the surface of a part which can then be coated with glass fiber cloth and resin to define either a model of the component part or a prototype of the part itself.

A further feature and advantage of the invention resides in the use of the cloth covered cardboard model to make a fiberglass or plaster mold from which multiple prototype parts may be fashioned.

BRIEF DESCRIPTION OF THE DRAWING

These and other features, objects, and advantages of the invention will become apparent upon consideration of the specification and the appended drawings in which.

DESCRIPTION OF THE PREFERRED EMBODIMENT

Figure 6:
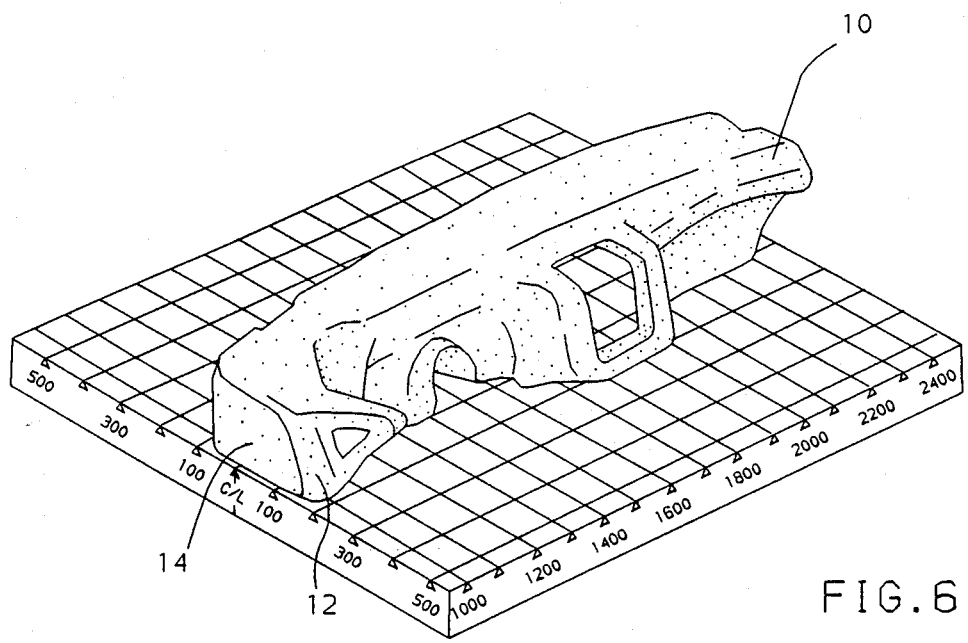
FIG. 6 shows a model of an instrument panel constructed according to the invention.

The invention relates to a method for making a model, prototype, and a mold for a motor vehicle component such as the instrument panel 10 shown in FIG. 6. The instrument panel may be of vacuum formed plastic, injection molded plastic, or stamped metal, and has an outside surface 12 and an inside surface 14.

MAKING A MODEL

Figure 1:
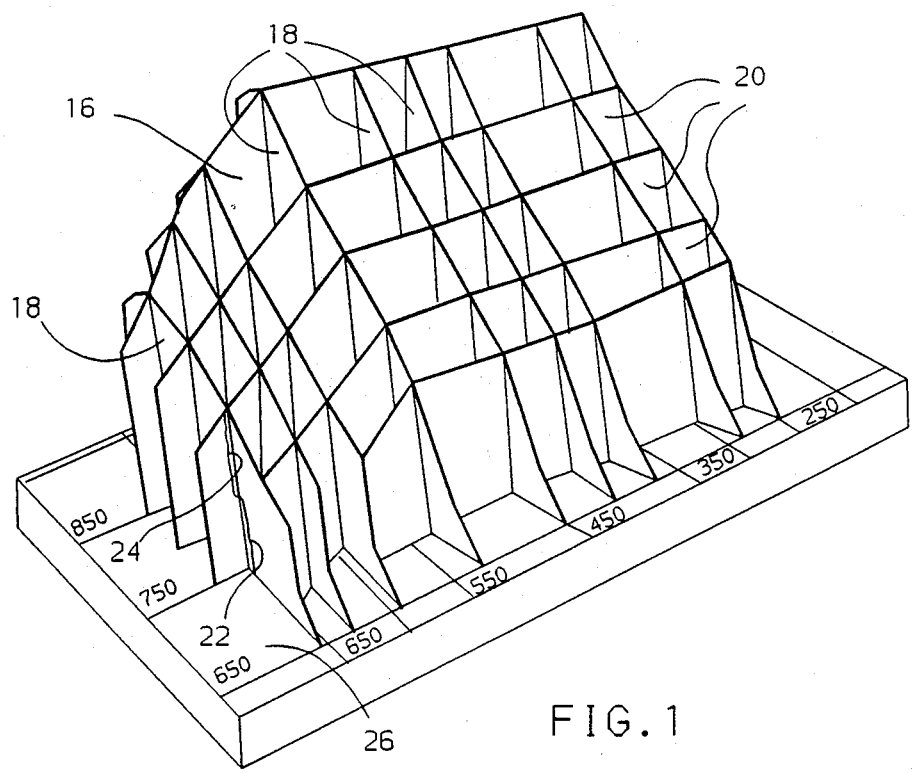
FIG. 1 is a perspective view showing templates cut in the shape of known inside cross sections of a component part and assembled into an egg crate skeletal frame and mounted upon a rigid base.

Referring to FIG. 1, a skeletal frame 16 for a model of a component part is shown. The skeletal frame is defined by a plurality of longitudinal templates 18 and a plurality of transverse templates 20. These templates are cut from a substantially rigid sheet material such as cardboard, plastic sheeting, or plywood. The templates are cut to the shape of known cross sections of the part and are prepared from a drawing of the prototype part. Accordingly the drawing of the prototype part, although not necessarily complete and accurate in all respects, must be sufficiently complete to provide both the longitudinal and transverse cross sections of the part so that the longitudinal templates 18 and the transverse templates 20 may be cut in the shape of the inside surface of the finished part.

The templates 18 and 20 are deliberately cut undersize with respect to the inside cross section of the part by a predetermined extent, as will be discussed hereinafter.

The templates 18 and 20 are preferably interlocked together by slots cut therein at the points of intersection between the longitudinal templates 18 and the transverse templates 20. For example, the longitudinal templates 18 may each have a downwardly opening slot 22 cut therein and the transverse template 20 may have an upwardly opening slot 24 therein. Accordingly, the transverse templates 20 are first attached to a rigid base 26 by an adhesive or by press fitting the template into grooves cut in the rigid base 22. Then, the longitudinal templates 18 are fitted downwardly over the transverse extending templates 20 as permitted by the slots 22 of the template 18 straddling the transverse template 20 while the upwardly opening slot 24 of the template 20 receives the longitudinal template 18.

Figure 2:
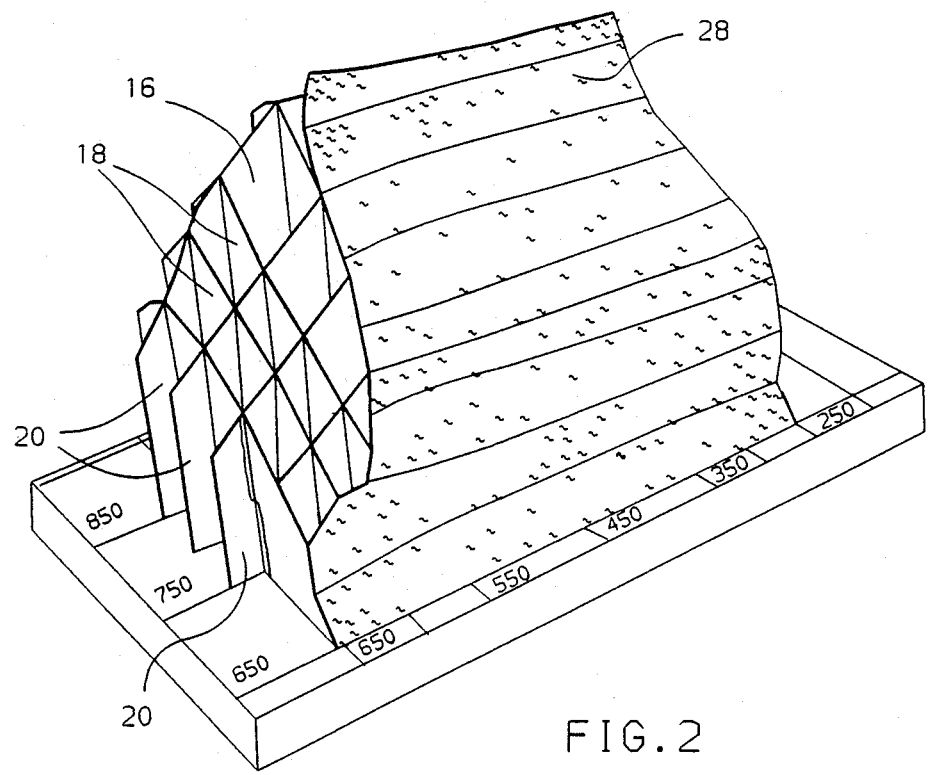
FIG. 2 shows a covering of rigid sheet material such as cardboard bonded onto the skeletal frame to define a rough model form and shape of the inside surface of the part.

Referring to FIG. 2, it is seen that a thin covering of sheet material 28, such as cardboard, plastic, or a composite material is adhesively bonded to the outer surface of the skeletal frame 16 to thereby create the rough form and shape of the inside surface of the desired finished part.

Figure 3:
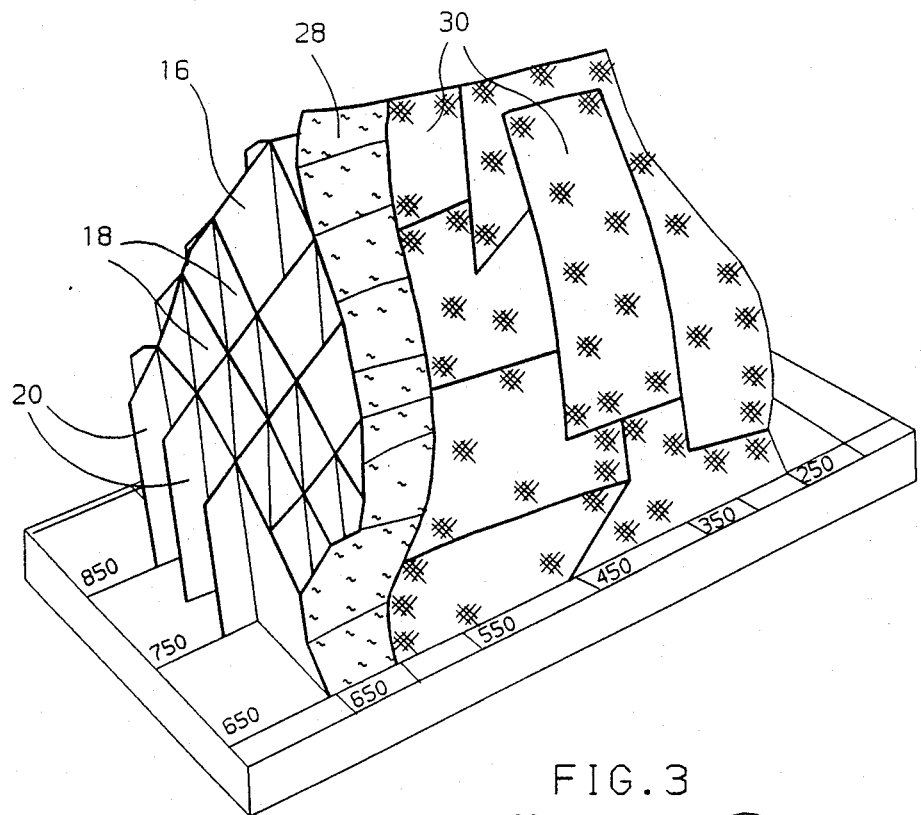
FIG. 3 shows layers of glass fiber cloth and bonding resin applied to the rough cardboard model.

Referring to FIG. 3, it is seen that the rough model defined by the cardboard covered skeletal frame 16 is coated with successive layers of cloth 30 woven of glass fibers cloth 30 and bonding resin to build up the finished outside surface of the part.

Figure 4:
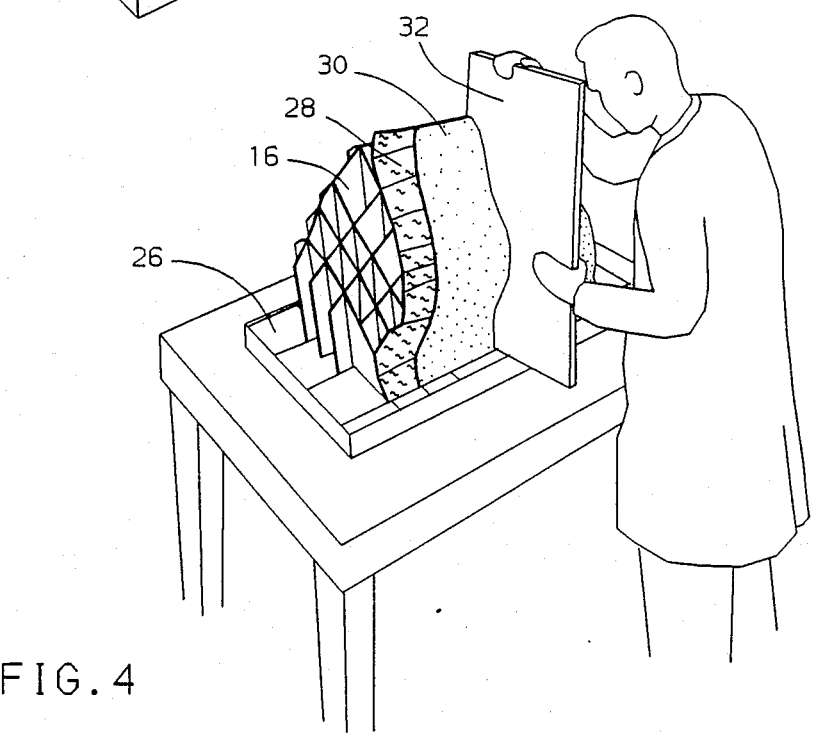
FIG. 4 shows an outside template cut from cardboard in the shape of the cross sectional outside finished shape of the part and used to determine the desired extent of the glass fiber cloth layering to achieve the outside finish surface dimension of the model lay up.

Referring to FIG. 4, it is seen that the outside surface dimension of the part is obtained and verified by the use of an outside template 32 which is cut from substantially rigid sheet material such as cardboard, plastic sheeting or plywood. These templates are cut to the shape of the known cross sections of the outside surface of the part as determined from the drawing of the prototype part. It will be understood, of course, that the skill of the designer is used to shape the glass fiber cloth 30 across the spaced interval between the particular cross sections which can be verified by the outside template 32.

Figure 5:
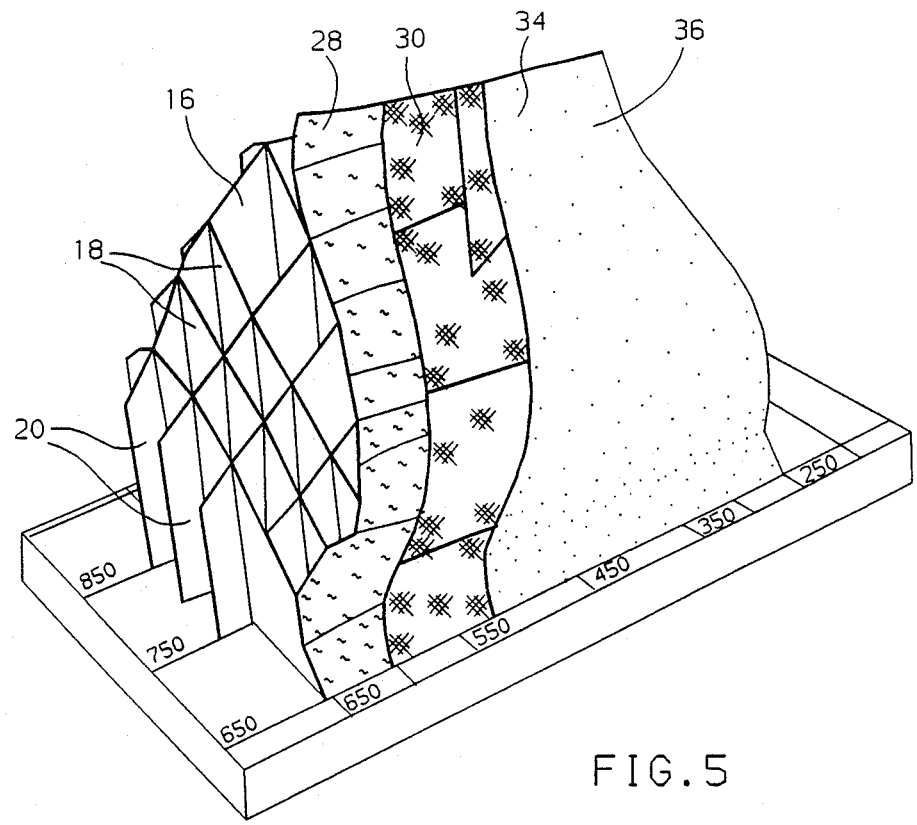
FIG. 5 shows the addition of a coating of bondo to fill in the rough surfaces.

Referring to FIG. 5, the finished model 34 is shown, with parts broken away in a section to show the skeletal frame 16, the cardboard cover 28, the layered glass fiber cloths 30, and a layer of plastic filler 36, such as the filler sold under the trademark "Bondo" which is applied to fill in the rough surfaces and sanded to precisely fit the outside surface template 32. Accordingly, it will be understood that FIG. 5 shows a finished styling and die model 34 of the outside surface 12 of the prototype part. Thus, it will be understood that the inside templates 18 and 20 will have been cut in size to an extent smaller than the actual inside surface of the part so that the build up of the cardboard cover 28 and the glass fiber cloth 30 will bring the plastic filler 34 out to the outside finished surface of the component part.

The finished styling and model 34 may be used to visualize the appearance and function of the component part.

MAKING A MOLD

It will also be understood that the styling model 34 may be used to make a mold for the subsequent manufacture of prototype parts. According to this embodiment of the invention, a release agent is applied to the finished outside surface of the model 34 shown in FIG. 5. Then, the mold is constructed by successively layering the finished model with resin and glass fiber cloth. After the resin has hardened, the mold is pulled from the finished model and has a female cavity with the shape of the prototype part therein. This female cavity may then be layered with glass fiber cloth to construct prototype parts. It will be understood that the mold may also be constructed of plaster, or some other suitable mold material. Furthermore, the mold may be cast of a porous composite material, in which case a vacuum may be pulled through the mold and the mold thereby used to vacuum form plastic parts.

MAKING A PROTOTYPE PART

It will also be understood that the invention embodies a method for making a prototype part without the necessity for making a mold. In this case, the rough model of the part shown in FIG. 2 is treated with a sealer and is then coated with a release agent. Then, glass fiber cloth is layered on the cardboard cover 28 as shown in FIG. 3. The outside templates are used to verify the outside surface of the glass fiber cloth, as shown in FIG. 4. If desired, the glass fiber cloth is finished by plastic filler 36, as shown in FIG. 5, and painted. Then, after suitable hardening and drying time, the glass fiber cloth prototype part is pulled from the rough form cardboard model. It will be understood that the durability of the rough formed cardboard model may limit the number of prototype parts which can be made without a mold to one or more parts.

It will be understood that although the prototype part made in this fashion is constructed of bonded glass fiber cloth, such a prototype part can be successfully used during the design process to simulate a part which, in production, will be made of stamped metal, injection molded plastic, vacuum formed plastic, or some composite material construction.

Thus, it is seen that the invention provides a new, improved and useful method for facilitating and expediting the design of motor vehicle parts. For example, after a rough form cardboard model 34 shown in FIG. 5 is constructed, changes or modifications to the component part may be easily made by cutting away and replacing portions of the rough cardboard model and/or the finished model. Such modifications are very much simpler than attempting changes to wooden or ren plank models of component parts as has been employed heretofore.

Thus, it is seen that the invention employs a glass fiber cloth cardboard model for both the visualization and the manufacture of prototype parts without the necessity for detailed drawings thereby enabling simultaneous design, development, engineering, and build up of a prototype vehicle body so that the time necessary to bring a new product to the marketplace is dramatically reduced.

The embodiments of the invention in which an exclusive property or privilege is claimed are defined as follows:

1. A method of making a styling and die model for a part comprising the steps of:
   making drawings of the cross sections at spaced intervals along the part;
   cutting a plurality of templates of the cross sectional shape of the part from thin sheets of substantially rigid material, said templates being cut smaller than the desired finish surface dimension of the part, wherein the drawings of the cross sections of the part are used to make the templates;
   mounting the templates on a rigid base at the same spaced intervals as the spaced intervals of the cross sections of the drawing to thereby define a skeletal frame of the part;
   covering the skeletal frame with a covering of substantially rigid sheet material adhesively bonded thereto to define a rough model form and shape of the part; and
   layering the rough model with cloth and bonding resin to the desired finish surface dimension shown on the drawing; and hardening the bonding resin.

2. A method of making a styling and die model for a part comprising the steps of:
   making drawings of the cross sections at spaced intervals along the part;
   cutting a plurality of inside templates of the cross sectional inside shape of the part from thin sheets of substantially rigid material, said inside templates being cut smaller than the desired inside finish surface dimension of the part, wherein the drawings of the cross sections of the part are used to make the templates;
   mounting the inside templates on a rigid base at the same spaced intervals as the spaced intervals of the cross sections of the drawing to thereby define a skeletal frame of the part;
   covering the skeletal frame with a covering of substantially rigid sheet material adhesively bonded thereto to define a rough model form and shape of the part;
   cutting a plurality of outside templates of the cross sectional outside finish shape of the part from thin sheets of substantially rigid material;
   and layering the rough model with cloth and bonding resin to build up to the desired outside finish surface dimension shown on the drawing by using the outside templates to verify the outside finished shape of the part; and hardening the bonding resin 3. A method of making a prototype of a part comprising the steps of:
   making drawings of the cross sections at spaced intervals along the part;
   cutting a plurality of inside templates of the cross sectional inside shape of the part from thin sheets of substantially rigid material, said inside templates being cut smaller than the desired inside finish surface dimension of the part wherein the drawings of the cross sections of the part are used to make the templates;
   mounting the inside templates on a rigid base at the same spaced intervals as the spaced intervals of the cross sections of the drawing to thereby define a skeletal frame of the part;
   covering the skeletal frame with a covering of substantially rigid sheet material adhesively bonded thereto to define a rough model form and shape of the inside surface of the part;
   coating the rough model with a release agent;
   cutting a plurality of outside templates of the cross sectional outside finish shape of the part from thin sheets of substantially rigid material;
   successively layering the coated rough model with cloth and bonding resin to a built up thickness obtaining the desired outside finish surface dimension shown on the drawing by using the outside templates to verify the outside finished shape of the part; and hardening the bonding resin; and
   removing the prototype part from the coated rough model subsequent to hardening of the bonding resin.

4. A method of making a mold for low volume manufacture of parts comprising the steps of:
   making drawings of the cross sections at spaced intervals along the part;
   cutting a plurality of inside templates of the cross sectional inside shape of the part from thin sheets of substantially rigid material, said inside templates being cut smaller than the desired inside finish surface dimension of the part;
   mounting the inside templates on a rigid base at the same spaced intervals as the spaced intervals of the cross sections of the drawing to thereby define a skeletal frame of the part, wherein the drawings of the cross sections of the part are used to make the templates;
   covering the skeletal frame with a covering of substantially rigid sheet material adhesively bonded thereto to define a rough model form and shape of the part;
   cutting a plurality of outside templates of the cross sectional outside finish shape of the part from thin sheets of substantially rigid material;
   layering the rough model with cloth and bonding resin to build up to the desired outside finish surface dimension shown on the drawing by using the outside templates to verify the outside finished shape of the part; hardening the bonding resin;
   finishing the surface of the rough model by filling with filler; and sanding and painting the outside surface to make a finished model;
   coating the outside surface of the finished model with a release agent;
   applying the mold making material to the coated surface of the model; hardening the material and
   pulling the mold from the finished model and using the mold to mold prototype parts.

5. A method of making a prototype sample of a part, comprising the steps of:
   making drawings of the cross sections at spaced intervals along the part;
   cutting a plurality of inside templates of the cross-sectional inside shape of the part from thin sheets of substantially rigid material, said inside templates being cut smaller than the desired inside finish surface dimension of the part wherein the drawings of the cross sections of the part are used to make the templates;
   mounting the inside templates on a rigid base at the same spaced intervals as the spaced intervals of the cross-sections of the drawing to thereby define a skeletal frame of the part;

covering the skeletal frame with a covering of substantially rigid sheet material adhesively bonded thereto to define a rough model form and shape of the inside surface of the part;

cutting a plurality of outside templates of the cross-sectional outside finish shape of the part form thin sheets of substantially rigid material;

successively layering the rough model with cloth and bonding resin to build up a prototype part having a thickness obtaining the desired outside finish surface dimension shown on the drawing by using the outside templates to verify the outside finished shape of the part; hardening the bonding resin; and removing the skeletal frame from the prototype part subsequent to hardening of the bonding resin.

* * * * *